US009819905B1

(12) United States Patent
Breitbard et al.

(10) Patent No.: US 9,819,905 B1
(45) Date of Patent: Nov. 14, 2017

(54) VIDEO COMMUNICATION SESSIONS BETWEEN WHITELISTED DEVICES

(71) Applicant: Amazon Technologies, Inc., Seattle, WA (US)

(72) Inventors: Eric Alan Breitbard, Oakland, CA (US); Michael Douglas McQueen, San Francisco, CA (US); Robert Steven Murdock, Fairfax, CA (US); Meng Li, San Francisco, CA (US); Stephan Josef Andrizzi, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/724,565

(22) Filed: May 28, 2015

(51) Int. Cl.
*H04N 7/14* (2006.01)
*H04L 29/06* (2006.01)

(52) U.S. Cl.
CPC ......... *H04N 7/147* (2013.01); *H04L 65/1069* (2013.01); *H04L 65/601* (2013.01)

(58) Field of Classification Search
USPC .......................................... 348/14.01–14.09
See application file for complete search history.

(56) References Cited

U.S. PATENT DOCUMENTS

| | | | |
|---|---|---|---|
| 8,340,258 B2 | 12/2012 | Baker et al. | |
| 8,938,394 B1 * | 1/2015 | Faaborg | G06F 3/167 |
| | | | 704/270 |
| 2006/0230137 A1 | 10/2006 | Gare et al. | |
| 2007/0103542 A1 * | 5/2007 | Carter | H04N 7/142 |
| | | | 348/14.06 |
| 2008/0291261 A1 | 11/2008 | Park et al. | |
| 2009/0315869 A1 | 12/2009 | Sugihara et al. | |
| 2010/0083188 A1 | 4/2010 | Pance et al. | |
| 2010/0123769 A1 * | 5/2010 | Cho | H04N 7/147 |
| | | | 348/14.02 |
| 2010/0205667 A1 | 8/2010 | Anderson et al. | |

(Continued)

OTHER PUBLICATIONS

Office action for U.S. Appl. No. 14/453,456, mailed Sep. 24, 2015; McQueen et al., "Variable Density Content Display," 16 pages.

(Continued)

*Primary Examiner* — Maria El-Zoobi
(74) *Attorney, Agent, or Firm* — Eversheds Sutherland (US) LLP

(57) ABSTRACT

A synchronous video communication session may be established between two devices having corresponding device profiles that are symmetrically or asymmetrically whitelisted with respect to each other. A first device located in a first environment may receive user input indicating a request to whitelist a second device located in a second environment. Whitelisting of the second device by the first device may cause a continuous live video stream to be presented on the second device. The continuous video stream may depict at least a portion of the first environment in which the first device is located. The continuous video stream may be initially at least partially obscured. Upon initiation of a video communication session between the first device and the second device, an audio stream may begin to be delivered between the devices and the video stream may no longer be obscured and a clear video image may be presented.

19 Claims, 10 Drawing Sheets

(56) References Cited

U.S. PATENT DOCUMENTS

| | | | |
|---|---|---|---|
| 2011/0111846 A1 | 5/2011 | Ciarrocchi | |
| 2012/0142316 A1 | 6/2012 | Park | |
| 2012/0268372 A1 | 10/2012 | Park et al. | |
| 2013/0110957 A1 | 5/2013 | Siegel | |
| 2013/0139171 A1 | 5/2013 | Kamphenkel | |
| 2013/0148023 A1 | 6/2013 | Sullivan et al. | |
| 2013/0179491 A1* | 7/2013 | Bennett | H04L 65/1076 709/203 |
| 2013/0227401 A1 | 8/2013 | Kandekar | |
| 2013/0231132 A1 | 9/2013 | Huang | |
| 2014/0123023 A1 | 5/2014 | Suzuki | |
| 2014/0181910 A1 | 6/2014 | Fingal | |
| 2014/0225931 A1 | 8/2014 | Plagemann | |
| 2015/0123919 A1 | 5/2015 | Yamada et al. | |
| 2015/0256796 A1* | 9/2015 | Ma | H04N 7/15 709/206 |
| 2015/0271318 A1* | 9/2015 | Antos | H04M 1/72583 455/412.1 |
| 2015/0365627 A1 | 12/2015 | Deng et al. | |

OTHER PUBLICATIONS

Office Action for U.S. Appl. No. 14/453,465 mailed Jul. 8, 2015; McQueen, "Automatically Staged Video Conversations," 23 pages.

Zhang, C., et al.; "Light Weight Background Blurring for Video Conferencing Applications," Microsoft Research. Redmond, WA (4 pages).

Yao, L., et al.; "FocalSpace: Multimodal Activity Tracking, Synthetic Blur and Adaptive Presentation for Video Conferencing," MIT Media Lab. Cambridge, MA. (5 pages).

\* cited by examiner

VIDEO COMMUNICATION SESSIONS BETWEEN WHITELISTED DEVICES

BACKGROUND

Video communication sessions such as video calls that allow for the bi-directional exchange of audio and video data may be underused for various reasons. For example, the process for locating a contact in one's contact list, dialing the contact, and waiting for a response from the contact may be too cumbersome in some instances, and an alternate form of communication such as Short Message Service (SMS) messaging—which does not require real-time bi-directional information exchange—may be preferred instead. In addition, the smaller form factors of smartphones or certain tablet devices may make video calling on such devices a less immersive, and thus, a less desirable experience. Various social barriers may also exist that limit the use of video calling. For example, a user may only initiate a video call if the user deems that the circumstances or the topic for discussion is of suitable importance to warrant a video call, and thus, may be hesitant to initiate a video call for more casual conversations. As another example, a user may be hesitant to initiate a video call without having knowledge as to whether the intended recipient is in a suitable environment for accepting the video call. These types of social barriers to video calling may cause a user to resort to less interactive forms of communication such as SMS messaging, instant messaging, voice calls, or the like.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1A:
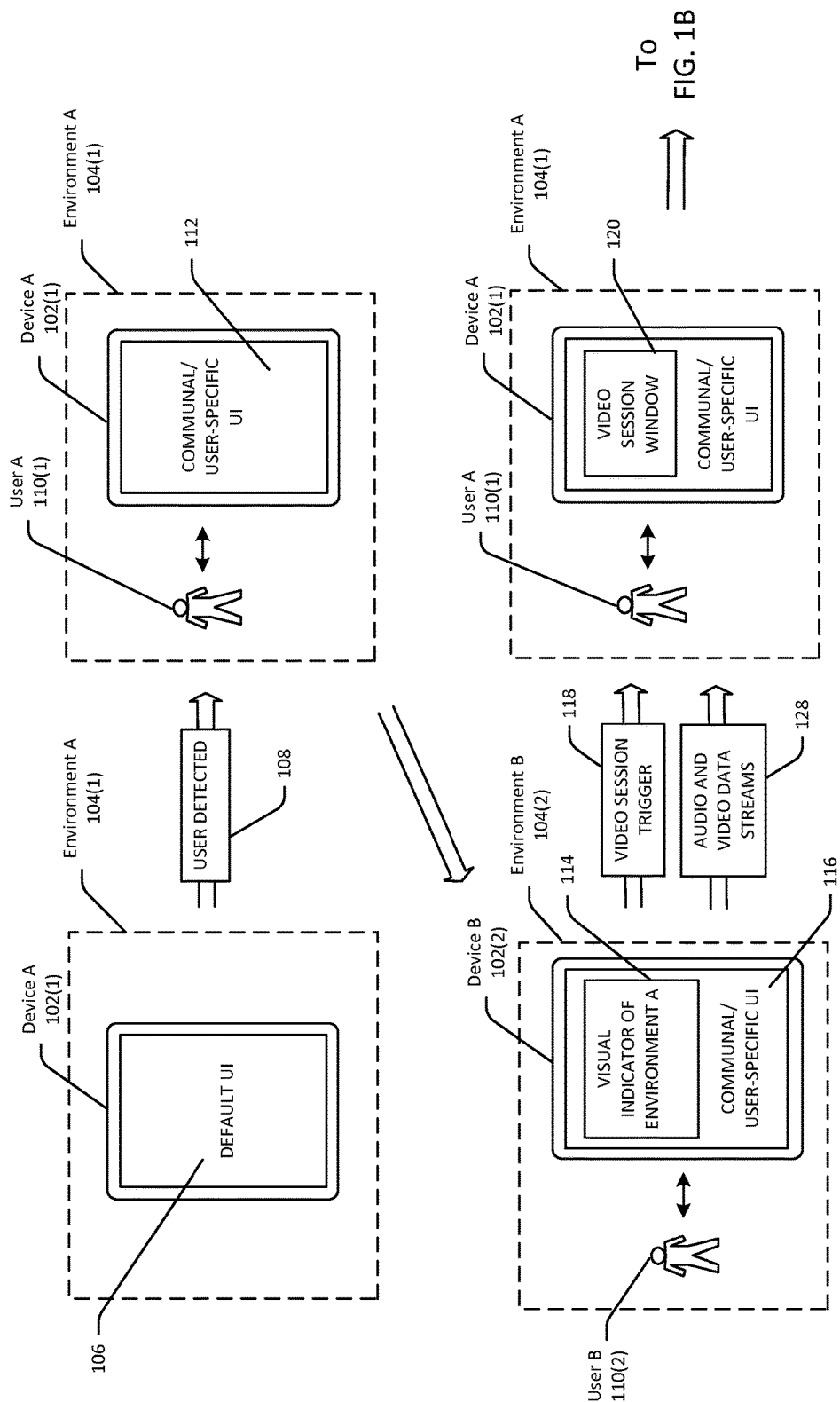
FIGS. 1A-1B are schematic diagrams illustrating a process for establishing a synchronous video communication session between whitelisted devices in accordance with one or more example embodiments of the disclosure.

This disclosure relates to, among other things, systems, methods, computer-readable media, techniques, and methodologies for establishing video communication sessions between devices. In certain example embodiments of the disclosure, a synchronous video communication session may be established between two or more remotely located devices. The synchronous video communication session may include real-time or near real-time multi-directional exchange of video and/or audio data between the two or more devices.

In certain example embodiments of the disclosure, a synchronous video communication session may be established between two devices having corresponding whitelisted device profiles. For example, a first device located in a first environment may receive user input indicating a user request to whitelist a second device located in a second environment that is remote from the first environment. The second device may be selected from a contact list, from search results, or the like. In response to the request to whitelist the second device, a first device profile associated with the first device may be linked to or otherwise associated with a second device profile associated with the second device. For example, a device identifier of the first device may be stored in association with a device identifier of the second device so as to indicate that the second device has been whitelisted by the first device.

If the second device profile has been whitelisted by the first device profile, an indication of the presence of a user in a first environment in which the first device is located may be provided to the second device and visually represented on the second device. The visual indicator may be a user interface (UI) object (e.g., an icon, an image, or any other suitable graphical or textual indicator) that indicates the presence of a user in the first environment. In some example embodiments, the visual indicator may indicate an identity of the user that is present in the first environment, while in other example embodiments, the visual indicator may merely indicate the user's presence but may not indicate the user's identity. In certain example embodiments, if the second device profile has been whitelisted by the first device profile, the visual indicator may be a continuous video stream of the first environment that is sent to the second device and presented via a display of the second device. The continuous video stream may depict a field of view of a camera of the first device. The continuous video stream may include one or more characteristics that at least partially obscure the video stream. For example, the video stream may be blurry (e.g., include a series of blurred video frames) such that a first user's presence in the first environment can be determined but an identity of the first user cannot be determined by a second user of the second device from the video stream alone.

The first device and the second device may be asymmetrically or symmetrically whitelisted with respect to each other. For example, if only the second device has been whitelisted by the first device, the device identifier of the first device may be stored in a one-way association with the device identifier of the second device so as to indicate that the second device has been whitelisted by the first device, but that the first device has not been whitelisted by the second device. The stored one-way association may be a pointer or any suitable data structure for indicating the directionality of the whitelisting between the devices. In certain example embodiments, a database table may be maintained that indicates, for each device profile, which other device profiles have been whitelisted by that device profile.

If, however, the first device has whitelisted the second device and vice versa, the device identifier of the first device and the device identifier of the second device may be stored in a two-way association that indicates that the first device and the second device are symmetrically whitelisted. For example, the two-way stored association may include a pointer from the device identifier of the first device to the device identifier of the second device and a pointer from the device identifier of the second device to the device identifier of the first device. In other example embodiments, a separate database table may be maintained for each device profile that indicates all other device profiles that have been whitelisted for each device profile.

In certain example embodiments, multiple user profiles may be associated with a device profile. Storing the device identifier of the first device in association with the device identifier of the second device in a one-way association that indicates that the second device has been whitelisted by the first device may indicate that each user profile associated with the second device profile is whitelisted by each user profile associated with the first device profile. Similarly, if the first device has been whitelisted by the second device, each user profile associated with the first device profile may be whitelisted by each user profile associated with the second device profile.

In certain example embodiments, individual user profiles may be whitelisted with respect to one another. For example, a first user profile associated with the first device profile may whitelist a second user profile associated with the second device profile. This may be an asymmetric whitelisting relationship, or in some example embodiments, may be a symmetric relationship, in which case, the second user profile may have also whitelisted the first user profile. In those example embodiments that allow for whitelisting between individual user profiles, a first user profile associated with the first device may have whitelisted a second user profile associated with the second device, but may not have whitelisted a third user profile also associated with the second device. In such a scenario, if a second user associated with the second user profile is identified by the second device, the second device may receive and present a visual indicator of a first user's presence in the environment of the first device if the first user is determined to be associated with the first user profile. However, if a third user associated with the third user profile, for example, is detected by the second device or a user present in the environment of the first device is not associated with the first user profile, the second device may receive no such visual indicator.

As previously described, if the second device has been whitelisted by the first device, a continuous live video stream may be presented on the second device. The continuous video stream may be captured by a camera of the first device and may depict at least a portion of the first environment in which the first device is located. The continuous video stream may be initially at least partially obscured. For example, the video stream may be obscured in such a manner so as to permit identification of the presence of a user in the video stream while making a determination of the user's identity or other aspects of the environment difficult or impossible. The video stream may not include any audio data. Upon initiation of a video communication session between the first device and the second device, an audio stream may begin to be delivered between the devices and the video stream may no longer be obscured and a clear video image may be presented.

In certain example embodiments, a video communication session between the first device and the second device may be triggered by receipt of user input. The user input may be, for example, voice input received at the second device, which for the purposes of illustration, is assumed to have been whitelisted with respect to the first device. The voice input may include one or more keywords or phrases that trigger the initiation of a video communication session with the first device. For example, the voice input may include a word or phrase representative of the first device profile associated with the first device or a word or phrase representative of a user profile associated with the first device.

Upon receipt of suitable user input at the second device, a user interface (UI) component (e.g., a video player) may begin streaming video on the first device of the second environment in which the second device is located. The video may initially be rendered in a window that does not occupy the full display of the first device. Upon receiving confirmation of an acceptance of the video communication session, the first device may present the video stream of the second environment in a larger window (e.g., the full display). Similarly, the second device may stream video of the first environment in which the first device is located, potentially in a window occupying the full display of the second device. In certain example embodiments, the obfuscation of the partially obscured view of the first environment may be removed in the video stream presented on the second device upon receiving an indication that the video communication session has been accepted at the first device.

During the video communication session between the first device and the second device various contextual triggers may be detected. For example, the audio data stream exchanged during the session may include various words or phrases that trigger identification of a corresponding user action and presentment of a UI component for initiating the user action on one or both of the first device and the second device. For example, during the video communication session, a particular user profile may be mentioned. More specifically, a word or phrase (e.g., "Mom") representative of the user profile may be mentioned. If the user profile is a common contact for both the first device profile and the second device profile, then a UI component may be presented during the video session allowing a user of the first device or a user of the second device to include the particular user profile in the session. If the user profile is a contact for only the first device profile, for example, then the UI component may be presented on the first device, and upon receiving user input indicative of a request to add the user profile to the video communication session, the second device may present a UI component allowing the user of the second device to either permit or reject addition of the user profile to the session.

As another example, a contextual trigger detected during a video communication session may cause contextual information to be identified and presented on one or both of the first device or the second device. As previously noted, the contextual trigger may be a word or phrase detected in the audio data exchanged during the session. For example, if the word "weather" is detected, local weather information may be determined and presented on one or both of the first device or the second device. As another example, if a restaurant or event is mentioned, corresponding contextual information (e.g., restaurant reviews) may be presented. In certain example embodiments, natural language processing of the audio data stream may be performed to identify contextual triggers and corresponding contextual information and/or candidate user actions.

In addition, in certain example embodiments, contextual triggers may be identified from the video data. For example, image recognition processing may be performed on the video data stream to identify an object present in the video data. Contextual information and/or candidate user actions relevant to the identified object may then be determined. For example, if a coffee maker is detected in the video data stream, product reviews for coffee makers, a UI component for initiating a purchase of a coffee maker or an accessory product, or the like may be presented on one or both of the first device or the second device. In certain example embodiments, a contextual trigger may be identified based on a combination of the audio data and the video data exchanged during a video communication session. For example, image recognition processing of the video data stream may identify a baseball glove present in the video data and processing of the audio data may reveal certain associated keywords (e.g., game). In such an example scenario, baseball or other sports-related product information, baseball or other sporting event information, or the like may be presented on one or both of the first device and the second device.

The video communication session between the first device and the second device may be terminated in various ways. For example, in certain example embodiments, a UI object may be displayed on each device that responsive to user selection causes the session to end. In other example embodiments, if user input corresponding to a particular word or phrase (e.g., "End Call") is received by either device, the session may be terminated. In yet other example embodiments, if no motion is detected in either video stream and/or no audio data is received at either device for a predetermined period of time, the session may be ended. In certain example embodiments, receipt of no audio data may be treated as equivalent to receipt of audio data that is below a threshold decibel level. In certain example embodiments, in order to automatically end a session, motion may need to be absent for the predetermined period of time from the video stream captured by a device and audio data may need to be undetected by the device for the predetermined period of time. This requirement avoids prematurely terminating a session if, for example, a user moves out of the field of view of the camera of a device and continues the conversation from a different environment that is within range for capture of audio data.

While the example scenario discussed above assumes that the second device has been whitelisted by the first device, it should be appreciated that the first device may also be whitelisted by the second device. That is, two devices may be symmetrically whitelisted such that, on each device, a visual indicator of user presence in the other device's environment may be presented. As previously described, the visual indicator presented on each device may be a continuous video data stream of a partially obscured view of the environment in which the other device is located. These partially obscured views may then become clear when a video communication session is established between the devices.

As previously described, in certain example embodiments, two devices may be asymmetrically whitelisted. Continuing with the example scenario introduced earlier, the second device may be whitelisted by the first device, but the first device may not be whitelisted by the second device. In such an example scenario, a live persistent obscured video feed of the environment in which the first device is located may be presented on the second device, but no such live video feed of the environment in which the second device is located may be presented on the first device. Further, upon receipt of user input at the second device triggering initiation of a video communication session with the first device, audio and video data generated in an environment in which the second device is located may be automatically broadcast to the first device. However, because the first device has not been whitelisted by the second device, the first device may not have the ability to automatically broadcast video and audio data to the second device (other than the obscured view of the environment in which the first device is located which may, in turn, become clear upon acceptance of a video communication session). Thus, in this example scenario, in order to initiate a video communication session with the second device, a user of the first device may need to select and dial a contact conventionally.

In addition, in the above asymmetric whitelisting scenario, because the first device does not have a live persistent video stream of the environment in which the second device is located (or other visual indicator of a user's presence in the environment in which the second device is located), an indicator may be presented on the first device whenever a user is in proximity to the second device and potentially viewing the obscured view of the environment in which the first device is located that is presented on the second device. In certain example embodiments, proximity sensors may be provided in a device to detect a user's presence in the environment. Further, in certain example embodiments, various other sensor(s) may be provided to detect whether a user is currently viewing a video stream presented on a device (e.g., an obscured video stream of an environment in which another device is located).

In certain example embodiments, there may be different tiers of whitelisting or permission levels. As previously described, two device profiles may be symmetrically whitelisted or asymmetrically whitelisted. While the following examples reference device profiles, it should be appreciated that the discussion is also applicable to user profiles. Two device profiles may be asymmetrically whitelisted at a first level or tier that corresponds to complete asymmetry between the device profiles. In a completely asymmetric whitelisting relationship, if a first device profile has been whitelisted by a second device profile, a visual indicator may be presented on a first device located in a first environment and corresponding to the first device profile. The visual indicator may indicate a user's presence in a second environment that includes a second device corresponding to the second device profile. The visual indicator may also indicate the user's identity. If the visual indicator is a video feed of the environment in which the second device is located, the video feed may be partially obscured (e.g., blurred) to allow a first user of the first device to determine that a second user is present in the second environment while at the same time preventing a determination of an identity of the second user. In certain example embodiments, even if the video feed is blurred, a separate UI object indicating an identity of the second user may be presented on the first device. In certain example embodiments, an audible indicator of the second user's presence in the second environment may be presented on the first device in addition to, or in lieu of, the visual indicator. For example, if the second device has whitelisted the first device, audio data captured by a microphone of the second device may be sent to the first device but no visual indicator of the second environment may be sent.

In the example above, while the first device profile has been whitelisted by the second device profile, because the second device profile has not been whitelisted by the first device profile and since the relationship is completely asymmetrical, the second device may receive no indication whatsoever of the first user's presence in the first environment. However, in other example embodiments, the second device profile may be partially whitelisted by the first device profile. Partial asymmetric whitelisting may correspond to an intermediate level or tier of asymmetric whitelisting. For example, if the first device profile partially whitelists the second device profile, the second device may receive some lower fidelity indicator of a user's presence in the first environment. For example, a UI object may be displayed on the second device indicating the presence of the first user in the first environment, but no video feed (even a blurred video feed) or audio feed of the first environment may be sent to the second device. In still other example embodiments, a blurred video feed of the first environment may be sent to the second device if the first device profile has partially whitelisted the second device profile, but no audio data captured by the first device may be sent to the second device. It should be appreciated that numerous other examples of partial asymmetric whitelisting are within the scope of this disclosure.

Example embodiments of the disclosure provide a number of technical features or technical effects. For example, in accordance with example embodiments of the disclosure, a synchronous video communication session may be established between two devices seamlessly without requiring explicit selection of a contact and initiation of the video communication session with the contact. As another example, different levels or tier of whitelisting are available between device or user profiles to permit a device to receive an indicator, at varying levels of fidelity, of a user's presence in an environment that includes another device based on the nature of the whitelisting relationship between device profiles or user profiles associated with the devices. It should be appreciated that the above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Figure 1B:
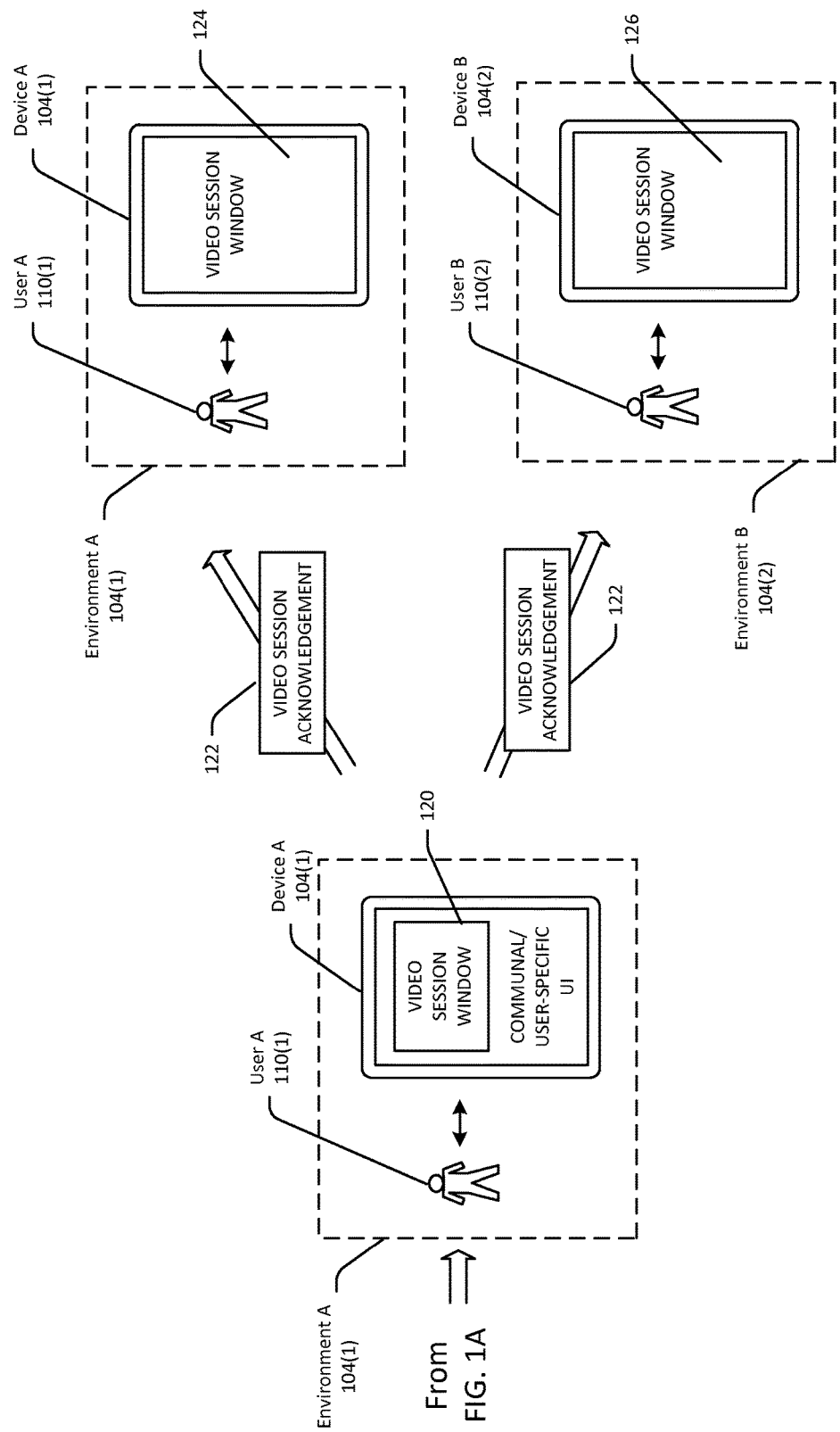

FIGS. 1A-1B are schematic diagrams illustrating a process for establishing a synchronous video communication session between whitelisted devices in accordance with one or more example embodiments of the disclosure. FIGS. 2A-2E are schematic diagrams illustrating example user interfaces associated with the process for establishing a synchronous video communication session between whitelisted devices in accordance with one or more example embodiments of the disclosure. In FIGS. 2A-2E, a user or device depicted above the dashed line is present in a particular physical environment and a user or device depicted below the dashed line is present in a different physical environment. Further, any description herein of data being transmitted from a first device to a second device may include transmission of the data from the first device to a server and transmission of the data from the first device to the second device. The server may be located remotely from the first device and the second device. FIGS. 1A-1B will be described in conjunction with FIGS. 2A-2E hereinafter.

Referring first to FIG. 1A, a first device 102(1) (hereinafter "Device A") may be provided in a first environment 104(1) (hereinafter "Environment A"). Device A may include a display, a touch sensor, one or more processors, one or more memories, persistent data storage, input/output interface(s), network interface(s), and so forth. The input/output interface(s) may be configured to interface with one or more input/output devices such as, for example, a camera, a microphone, a sensor, or the like, any of which may be integrally included in Device A or provided external to Device A. The various components of an illustrative configuration of Device A will be described in more detail in reference to FIG. 4.

A default UI 106 may initially be presented on the display of Device A. The default UI 106 may be displayed if, for example, no user is detected within a certain distance of Device A. The default UI 106 may include information displayed while Device A is in an idle state such as, for example, time and date information. Upon detection 108 of the presence of a user 110(1) (hereinafter "User A") within proximity of Device A (e.g., inside Environment A and within a threshold distance from Device A), a communal or user-specific UI 112 may be displayed on Device A.

Figure 2A:
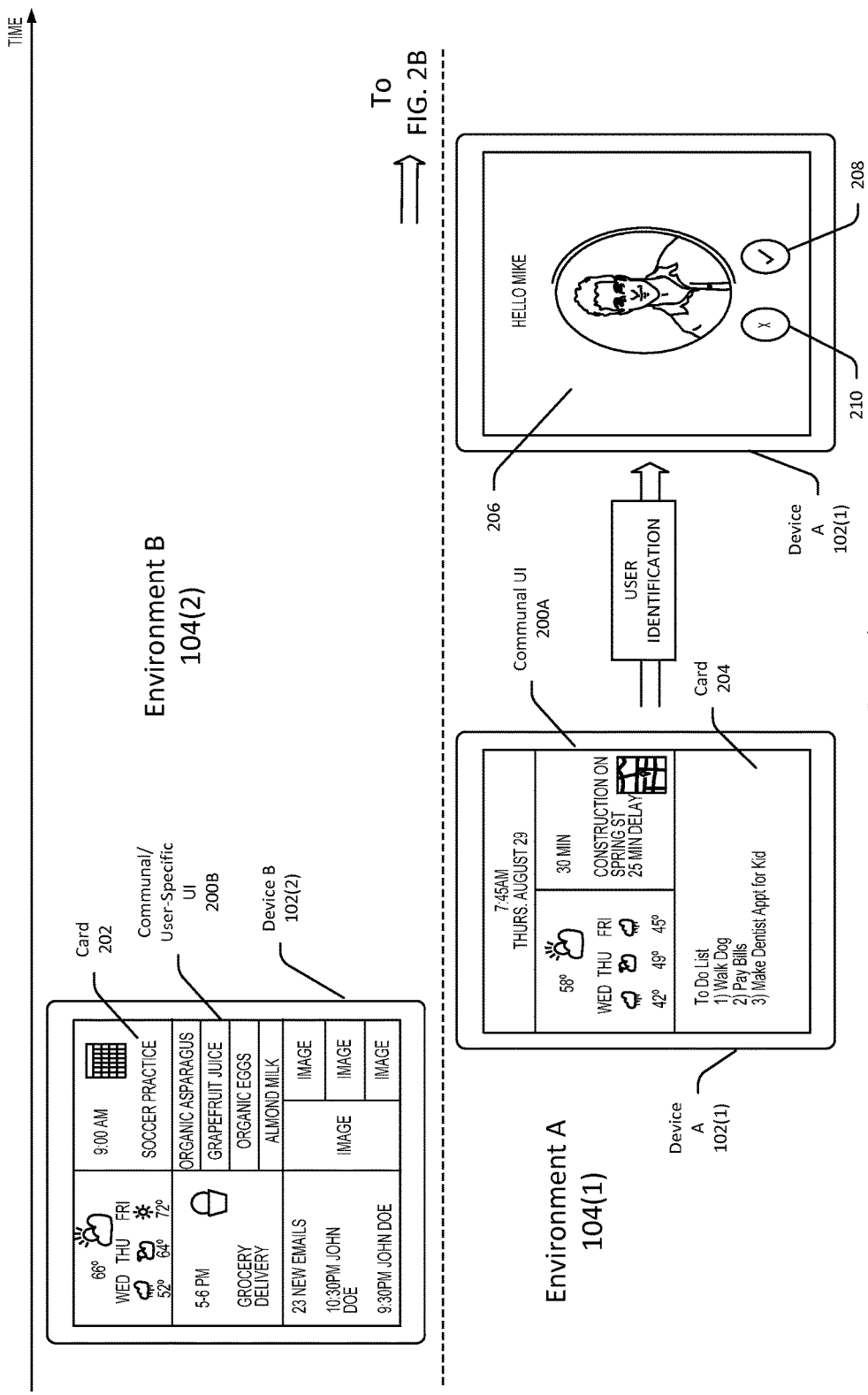
FIGS. 2A-2E are schematic diagrams illustrating example user interfaces associated with a process for establishing a synchronous video communication session between whitelisted devices in accordance with one or more example embodiments of the disclosure.

In certain example embodiments, a proximity sensor or the like may detect the presence of User A but may not determine an identity of User A. In such example embodiments, a communal UI may be presented that may include information that is generally applicable to multiple user profiles associated with Device A and/or user profile-specific information for multiple user profiles. FIG. 2A depicts an example communal UI 200A that may be displayed on Device A. The communal UI 200A may include one or more cards 204. Each card may be a distinct UI object that includes text, image content, video content, or the like associated with a particular category of content that may be relevant to multiple user profiles associated with Device A or to any particular user profile. For example, the communal UI 200A may include a weather card 204 that provides weather information for a geographic region in which Environment A is located. As another example, the communal UI 200A may include a "to-do" list that includes tasks relevant to multiple user profiles associated with the Device A. The communal UI 200A may also include card(s) 204 that include information specific to a particular user profile. For example, the communal UI 200A may include a traffic card 204 that provides traffic information for a work commute associated with a particular user profile.

Figure 2B:
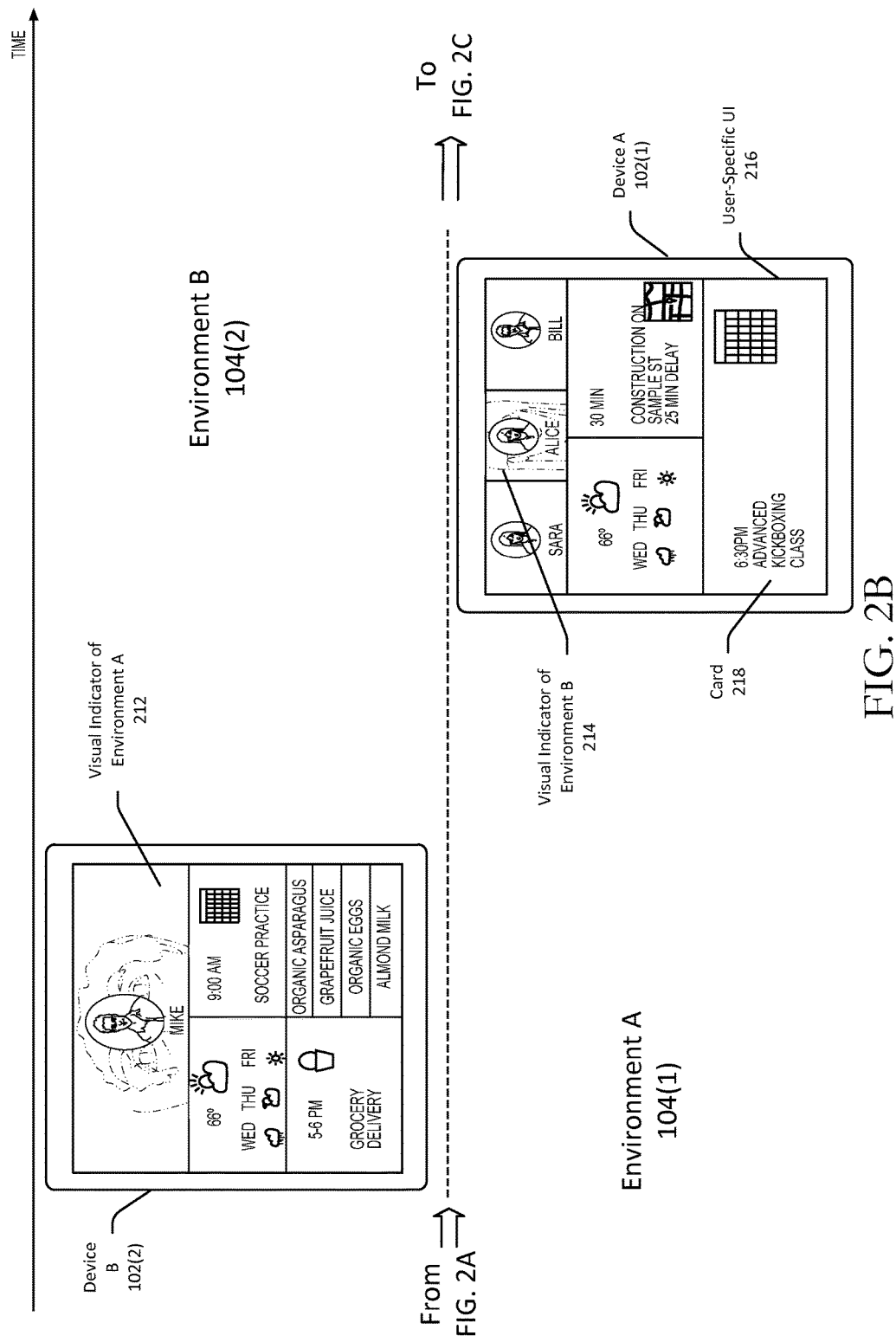

In certain example embodiments, one or more sensors of Device A may determine an identity of User A, in which case, a UI that includes information specific to User A may be presented. For example, a camera of Device A may capture an image of User A and facial recognition software may be executed on Device A or on one or more remote servers to determine a user profile that corresponds to User A. As another example, an identity of User A may be detected using biometrics. After or during identification of User A, an interim UI 206 may be presented on Device A prior to presentation of a user-specific UI for User A. The UI 206 may be presented, for example, while the content for the user-specific UI is being aggregated. The UI 206 may include, for example, an image associated with the user profile for User A. In certain example embodiments, the UI 206 may be displayed while processing is being performed to confirm the identity of User A. In such example embodiments, a UI object 208 may be displayed to allow User A to manually confirm that the displayed image corresponds to his/her profile and a UI object 210 may be displayed to allow User A to indicate that the displayed image does not correspond to his/her profile or to prevent the user-specific UI for User A from being displayed. Referring now to FIG. 2B, upon confirming the identity of User A, a user-specific UI 216 corresponding to User A's profile may be displayed on Device A. The user-specific UI 216 may include one or more cards from the communal UI 200A. Additionally, or alternatively, the user-specific UI 216 may include one or more cards 218 that includes information specific to User A's profile.

Referring again to FIG. 1A, a second device 102(2) (hereinafter "Device B") may be provided in a second environment 104(2) (hereinafter "Environment B"). A second user 110(2) (hereinafter "User B") may be present within Environment B and within a suitable proximity of Device B to cause a communal or user-specific UI 116 to be presented on a display of Device B. An example communal or user-specific UI 200B that may correspond to the UI 116 is depicted in FIG. 2B. The UI 200B may include one or more cards 202 that may include content relevant to one or more user profiles associated with Device B. In certain example embodiments, Device B may be whitelisted by Device A. Referring to FIG. 1A, in such example embodiments, a visual indicator 114 of Environment A may be presented on Device B. The visual indicator 114 may be any suitable indicator representing Environment A. The visual indicator 114 may indicate the presence of a user in Environment A, and may optionally further indicate the identity of the user present in Environment A (e.g., the identity of User A). The visual indicator 114 may be an icon, an image, or another graphical or textual indicator of user presence in Environment A. Alternatively, referring to FIG. 2B, the visual indicator 114 may be a continuous (potentially obscured) video stream 212 of Environment A captured by Device A. In certain example embodiments, an audible or haptic indicator of the presence of a user in Environment A may be presented via Device B in addition to, or in lieu of, the visual indicator 114.

As previously noted, in certain example embodiments, the visual indicator 114 may be a video feed 212 of Environment A captured by a camera of Device A. For example, a UI component (e.g., a window, video player, etc.) may render a live persistent video stream 212 on Device B. The video stream 212 may include video data representative of a field of view of Environment A captured by one or more cameras of Device A. The video stream 212 may be partially obscured so as to permit User B to determine that an object (e.g., User A) is present in Environment A but prevent User B from determining an identity of User A. For example, the video stream 212 may present a clouded or blurry view of Environment A.

In certain example embodiments, Device A and Device B may be symmetrically whitelisted. That is, Device B may have also whitelisted Device A, in which case, a visual indicator 214 of Environment B may be presented on Device A, as shown in FIG. 2B. As with the visual indicator 114, the visual indicator 214 may be any suitable indicator representing Environment B and may potentially indicate the presence of a user in Environment B. The visual indicator 214 may further indicate the identity of the user present in Environment B (e.g., the identity of User B). The visual indicator 214 may be an icon, an image, or other graphical or textual indicator of Environment B that may indicate the presence, and optionally, the identity of a user present in Environment B (e.g., User B). In certain example embodiments, the visual indicator 214 may be a continuous (potentially obscured) video stream of Environment B captured by Device B. In certain example embodiments, an audible or haptic indicator of the presence of a user in Environment B may be presented via Device A in addition to, or in lieu of, the visual indicator 214.

As shown illustratively in FIG. 2B, the visual indicator 212 and the visual indicator 214 may have different appearances. For example, the visual indicator 212 is illustratively shown in FIG. 2B as being a video stream presented within a window completely occupying a top portion of a display of Device B, and the visual indicator 214 is illustratively shown as being a video stream presented within a window rendered in a top portion of a display of Device A alongside indicators of other contacts associated with a device profile of Device A or one or more user profiles of Device A. In addition, while the visual indicator 212 and/or the visual indicator 214 have been described as being continuous video streams in various example embodiments, it should be noted that in certain other example embodiments, the visual indicator 212 and/or the visual indicator 214 may be prerecorded video of Environment A or Environment B, respectively.

Figure 2C:
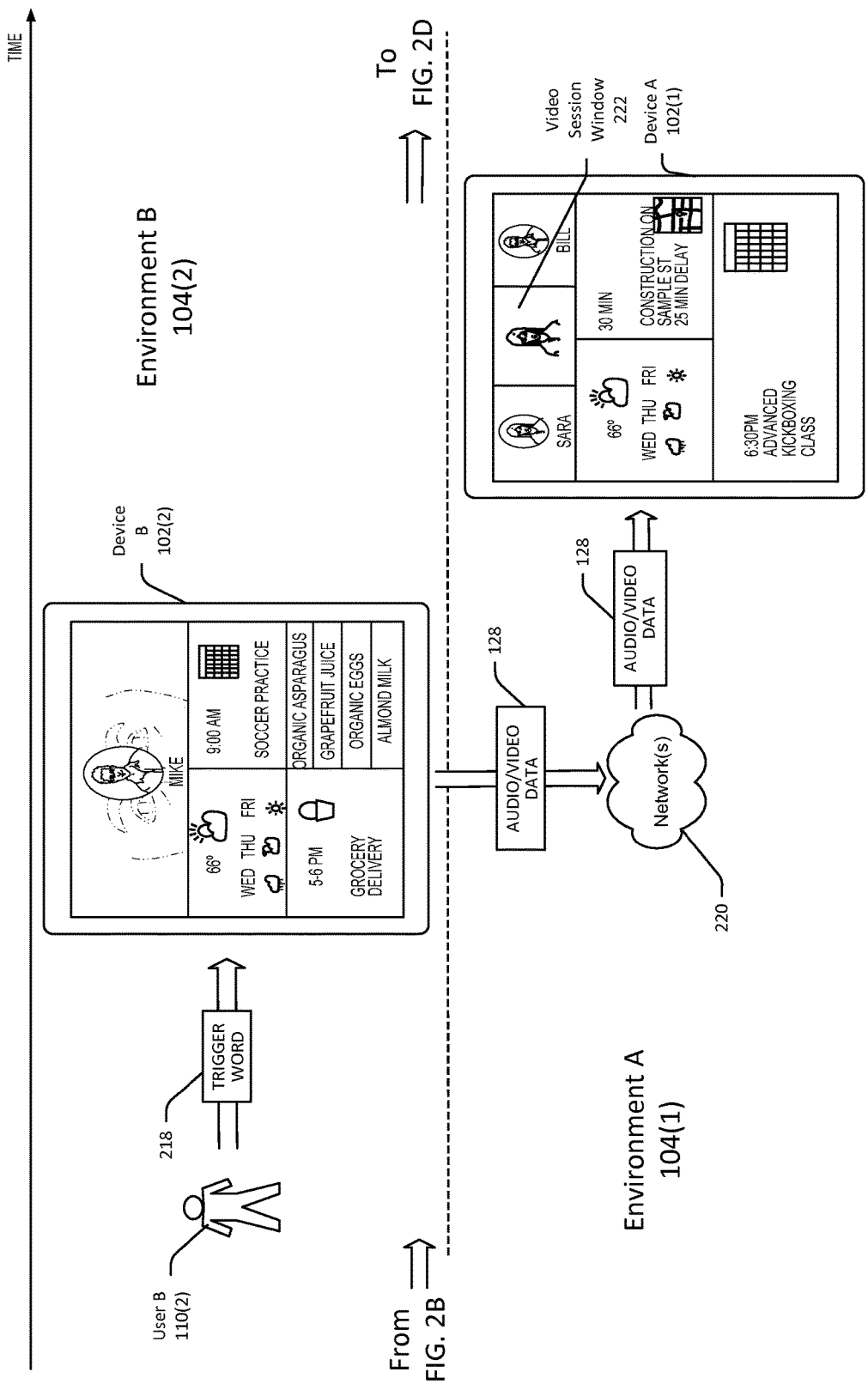
Figure 2D:
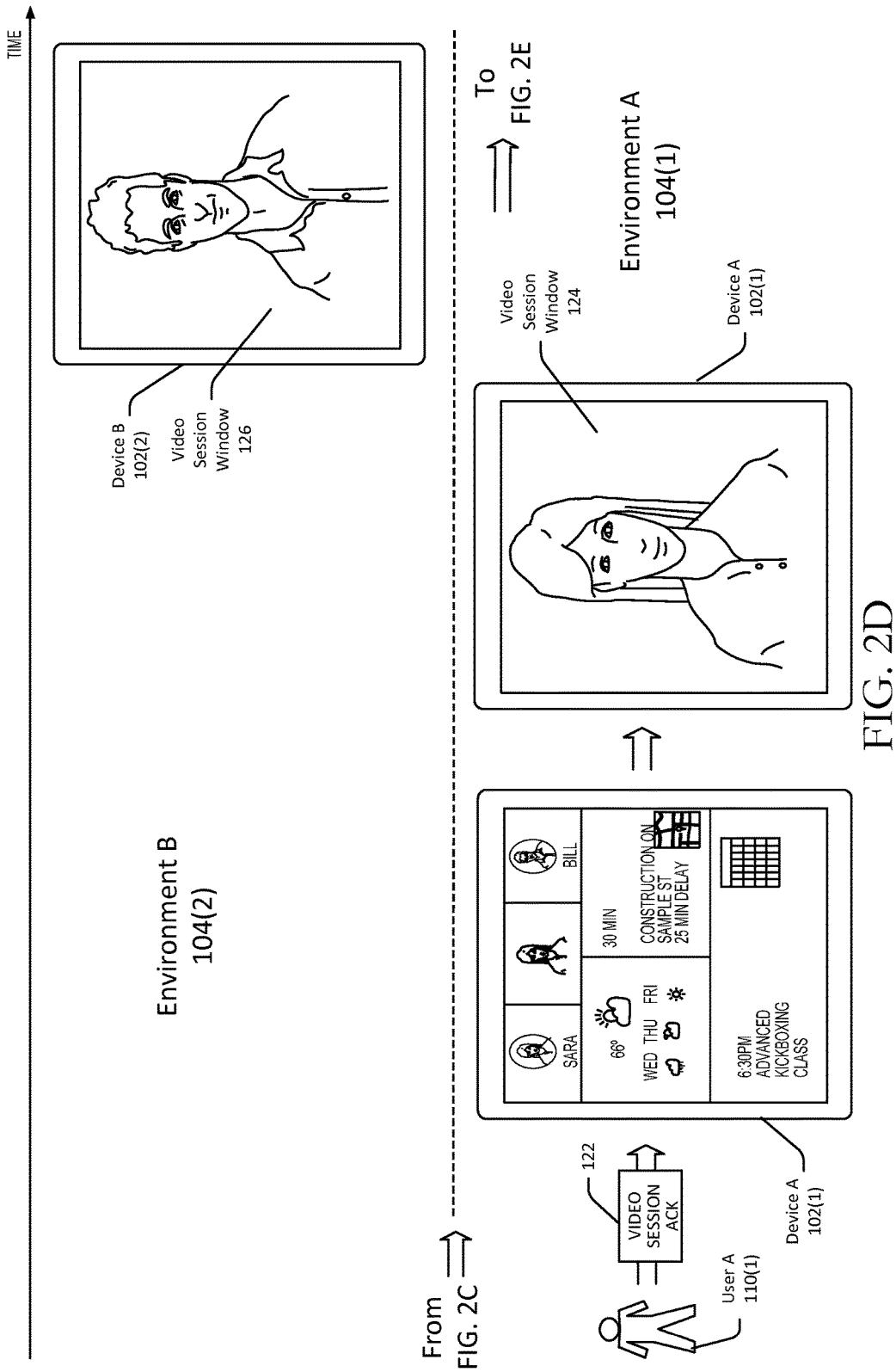

User B may provide user input 118 to Device B that causes a video communication session to be triggered between Device A and Device B. In particular, in response to receipt of the user input 118, a video data stream 128 of Environment B may be presented on Device A via a UI component 120 (e.g., a session window, a video player, etc.). Referring to FIGS. 1A and 2C in conjunction with one another, a session window or video player 222 is shown as an example of the UI component 120. In addition, an audio data stream 128 captured at Device B may also be sent to Device A via one or more networks 220 and presented via one or more speakers internal to Device A or external to Device A and communicatively coupled thereto. In certain example embodiments, the user input 118 may include a trigger word or phrase 218. More specifically, the audio input data 118 may be received at Device B and sent to one or more remote servers. The remote server(s) may perform natural language processing or other processing on the audio data to determine that the trigger word or phrase 218 is present in the audio data. For example, the remote server(s) may compare the audio data against a predetermined set of keywords or phrases to determine that the audio includes one or more words or phrases that match one or more of the predetermined set of keywords or phrases.

In certain example embodiments, audio data representing voice input received at Device B may initially be presented via one or more speakers associated with Device A, and the video data stream may be initiated after the audio data has been streamed for a predetermined time period. This delay between transmission of the video data stream and transmission of the audio data stream may be introduced to provide audio/video (A/V) synchronization. In other example embodiments, the audio data may be sent from Device B to a remote server and processed by the remote server to first determine the presence of the trigger word or phrase 218 in the audio data prior to transmission of the video data from Device B to the remote server, thereby introducing the delay between initiation of transmission of the audio data and initiation of transmission of the video data from Device B to Device A. Thereafter, the audio and video data may be streamed simultaneously.

The trigger word or phrase 218 may be a word or phrase that identifies Device A such that a video communication session may be triggered with Device A based on the word or phrase regardless of which (if any) user may be present in Environment A. In other example embodiments, a video communication session may be triggered with Device A as long as the voice input 118 includes a trigger word or phrase 218 that identifies any user profile linked to Device A (e.g., linked to a device profile associated with Device A). In still other example embodiments, the user input 118 may include a trigger word or phrase 218 that identifies a particular user (e.g., User A), in which case, a video communication session may only be triggered if that user is present in Environment A. In such example embodiments, an indicator that User A is present in Environment A may be presented on Device B to inform User B of the presence and identity of User A.

Referring now to FIG. 1B, while the audio and video data representative of Environment B is presented on Device A, the visual indicator 114—which may be a partially obscured video data stream 212 of Environment A—may continue to be presented on Device B until input is received at Device A indicating acknowledgment of the video communication session that has been initiated by Device B. Upon receipt of an acknowledgment 122 of the video communication session at Device A, the partially obscured video stream 212 presented on Device B may be made clear and the video data stream may potentially be presented on Device B within a full display video session window 126. Similarly, upon receipt of the acknowledgement 122 of the video communication session, the video data stream representative of Environment B may be presented within a full display video session window 124 on Device A. The acknowledgment 122 may include any voice input provided to Device A after initiation of the video communication session. In other example embodiments, the acknowledgment 122 may include a specific word or phrase associated with Device B or a user profile that is associated with Device B.

As previously described, during the video communication session between Device A and Device B, a contextual trigger 224 may be detected in the audio and/or video data streams exchanged between the devices during the session. In certain example embodiments, a remote server may receive audio and video data streams captured by a device (Device A or Device B) and may perform natural language processing or other processing on one or both of the audio or video data streams prior to sending the data streams to the other device. As part of this processing, the remote server may identify a contextual trigger 224 present in the data streams. For example, the remote server may determine that a received audio data stream includes a particular word or phrase. As another example, the remote server may determine that a received video data stream includes a particular object using image recognition processing.

Figure 2E:
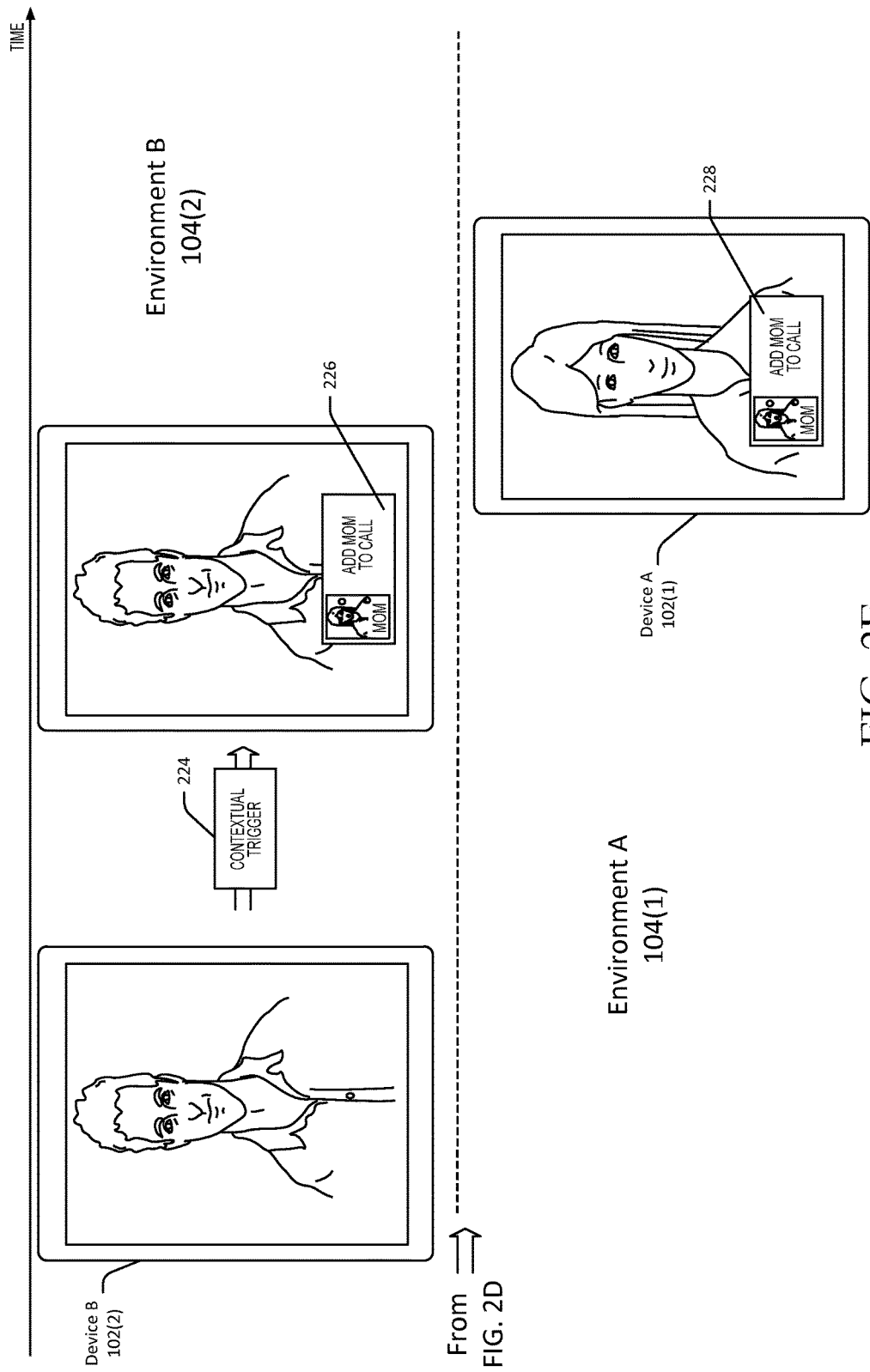

After determining that the audio and/or video data streams include a contextual trigger 224, in certain example embodiments, contextual information corresponding to the contextual trigger 224 may be determined and presented via Device A and/or Device B. For example, if the word "weather" is detected, weather information may be displayed on Device A and/or Device B. In certain example embodiments, the contextual information may only be displayed on the device that captured the audio and/or video data stream from which the contextual trigger 224 was determined. In other example embodiments, a candidate user action corresponding to the contextual trigger 224 may be determined. For example, as shown in FIG. 2E, the contextual trigger 224 may be a word or phrase that identifies a user profile. The user profile may be a contact associated with a device profile of Device A and/or a device profile of Device B. Additionally, or alternatively, the user profile may be linked to one or more user profiles associated with Device A and/or one or more user profiles associated with Device B. The candidate user action may be the option to include the user profile in the current video communication session. Accordingly, a selectable UI object 226 and/or a selectable UI object 228 may be presented on Device B and/or Device A, respectively, that responsive to selection enables the user profile identified by the contextual trigger 224 to be added to the existing video communication session.

Figure 3:
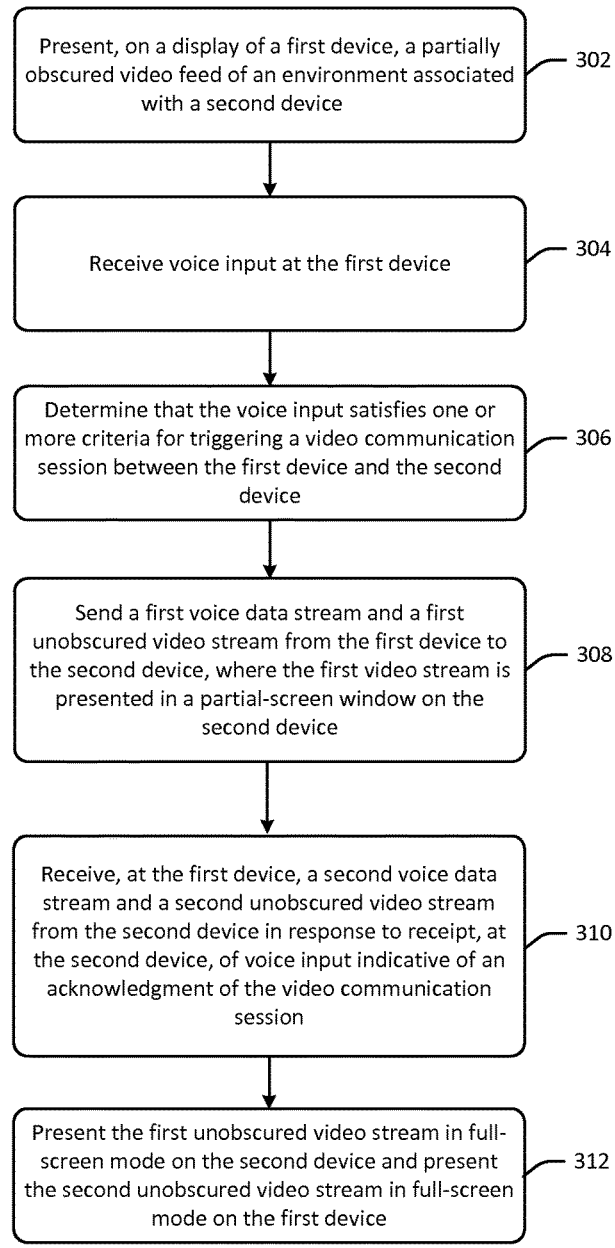
FIG. 3 is a process flow diagram of an illustrative method for establishing a synchronous video communication session between whitelisted devices in accordance with one or more example embodiments of the disclosure.

FIG. 3 is a process flow diagram of an illustrative method 300 for establishing a synchronous video communication session between whitelisted devices in accordance with one or more example embodiments of the disclosure.

At block 302, assuming that a second device has whitelisted a first device, a visual indicator of an environment in which the second device is located may be presented on a display of the first device. The visual indicator may be, for example, a partially obscured video feed that includes video data representative of an environment associated with the second device. The first device and the second device may be symmetrically or asymmetrically whitelisted with respect to each other. Assuming that the first device and the second device are symmetrically whitelisted, a live persistent video data stream containing a partially obscured view of an environment associated with the first device may also be presented on a display of the second device.

At block 304, voice input may be received at the first device. At block 306, the first device (or a back-end remote server) may determine that the voice input satisfies one or more criteria for triggering a video communication session between the first device and the second device. For example, the first device (or the back-end server) may determine that the voice input includes a word or phrase that identifies the second device or a user profile known to be associated with the second device.

At block 308, the video communication session may be initiated. In particular, a first audio data stream and a first unobscured video stream may be sent from the first device to the second device. In particular, the first audio data stream and the first unobscured video stream may be captured by the first device and communicated to the second whitelisted device via one or more networks, and potentially through the back-end server. The audio data stream may be initially received by the second device, followed by the first unobscured video data stream after a predetermined time period. The first unobscured video stream may be presented initially in a partial-screen window on the second device.

At block 310, a second voice data stream and a second unobscured video stream may be received at the first device from the second device in response to receipt, at the second device, of voice input indicative of an acknowledgment of the video communication session. The voice input indicative of an acknowledgment of the video communication session may include a word or phrase that identifies the first device or a user profile associated with the first device. Thereafter, at block 312, the first unobscured video stream may be presented in full-screen mode on the second device and the second unobscured video stream may be presented in full-screen mode on the first device.

Figure 4:
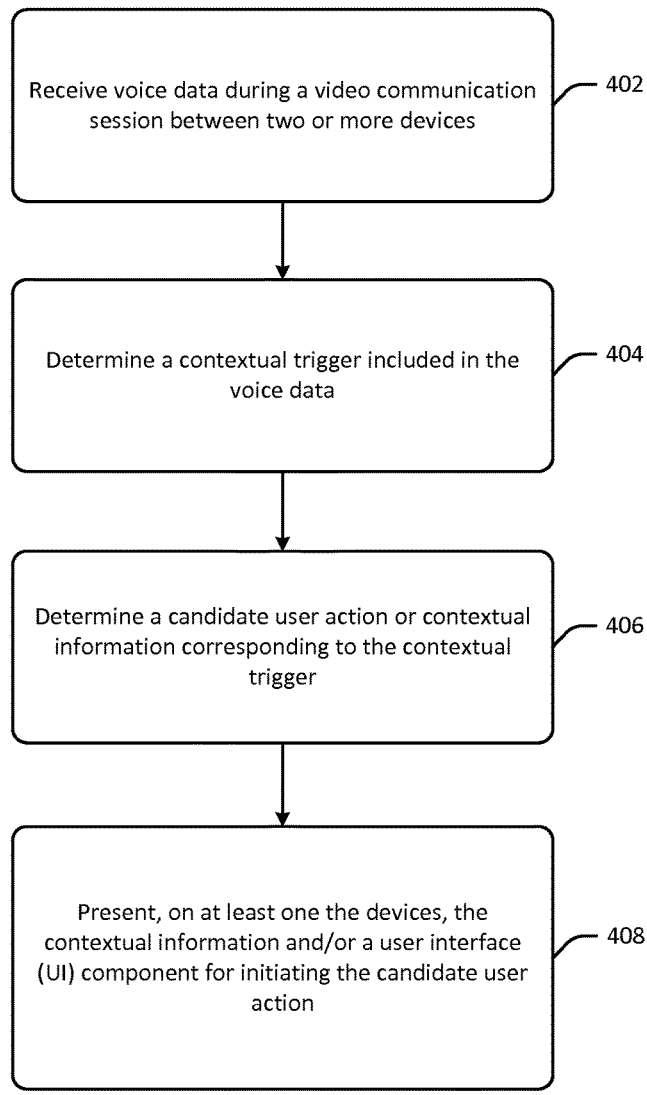
FIG. 4 is a process flow diagram of an illustrative method for determining a contextual trigger during a video communication session, determining a candidate user action or contextual information corresponding to the contextual trigger, and presenting the contextual information and/or a user interface (UI) component for initiating the candidate user action in accordance with one or more example embodiments of the disclosure.

FIG. 4 is a process flow diagram of an illustrative method 400 for determining a contextual trigger during a video communication session, determining a candidate user action or contextual information corresponding to the contextual trigger, and presenting the contextual information and/or a user interface (UI) component for initiating the candidate user action in accordance with one or more example embodiments of the disclosure. The method 400 may be performed by one or more back-end servers and/or one or more devices involved in a video communication session.

At block 402, voice data may be received during a video communication session between two or more devices. At block 404, the voice data may be analyzed to determine that the voice data includes a contextual trigger. At block 406, a candidate user action or contextual information corresponding to the contextual trigger may be determined. At block 408, the contextual information and/or a UI component for initiating the candidate user action may be presented on one or more of the devices involved in the video communication session.

For example, the audio data stream exchanged during the session may include various words or phrases that trigger identification of a corresponding user action and presentment of a UI component for initiating the user action on one or both of the first device and the second device. For example, during the video communication session, a particular user profile may be mentioned. More specifically, a word or phrase (e.g., "Mom") representative of the user profile may be mentioned. If the user profile is a common contact for both the first device profile and the second device profile, then a UI component may be presented during the video session allowing a user of the first device or a user of the second device to include the particular user profile in the session.

As another example, a contextual trigger detected during a video communication session may cause contextual information to be identified and presented on one or both of the first device or the second device. As previously noted, the contextual trigger may be a word or phrase detected in the audio data exchanged during the session. For example, if the word "weather" is detected, local weather information may be determined and presented on one or both of the first device or the second device. As another example, if a restaurant or event is mentioned, corresponding contextual information (e.g., restaurant reviews) may be presented. In certain example embodiments, natural language processing of the audio data stream may be performed to identify contextual triggers and corresponding contextual information and/or candidate user actions.

In addition, in certain example embodiments, contextual triggers may be identified from the video data. For example, image recognition processing may be performed on the video data stream to identify an object present in the video data. Contextual information and/or candidate user actions relevant to the identified object may then be determined. For example, if a coffee maker is detected in the video data stream, product reviews for coffee makers, a UI component for initiating a purchase of a coffee maker or an accessory product, or the like may be presented on one or both of the first device or the second device. In certain example embodiments, a contextual trigger may be identified based on a combination of the audio data and the video data exchanged during a video communication session. For example, image recognition processing of the video data stream may identify a baseball glove present in the video data and processing of the audio data may reveal certain associated keywords (e.g., game). In such an example scenario, baseball or other sports-related product information, baseball or other sporting event information, or the like may be presented on one or both of the first device and the second device.

Figure 5:
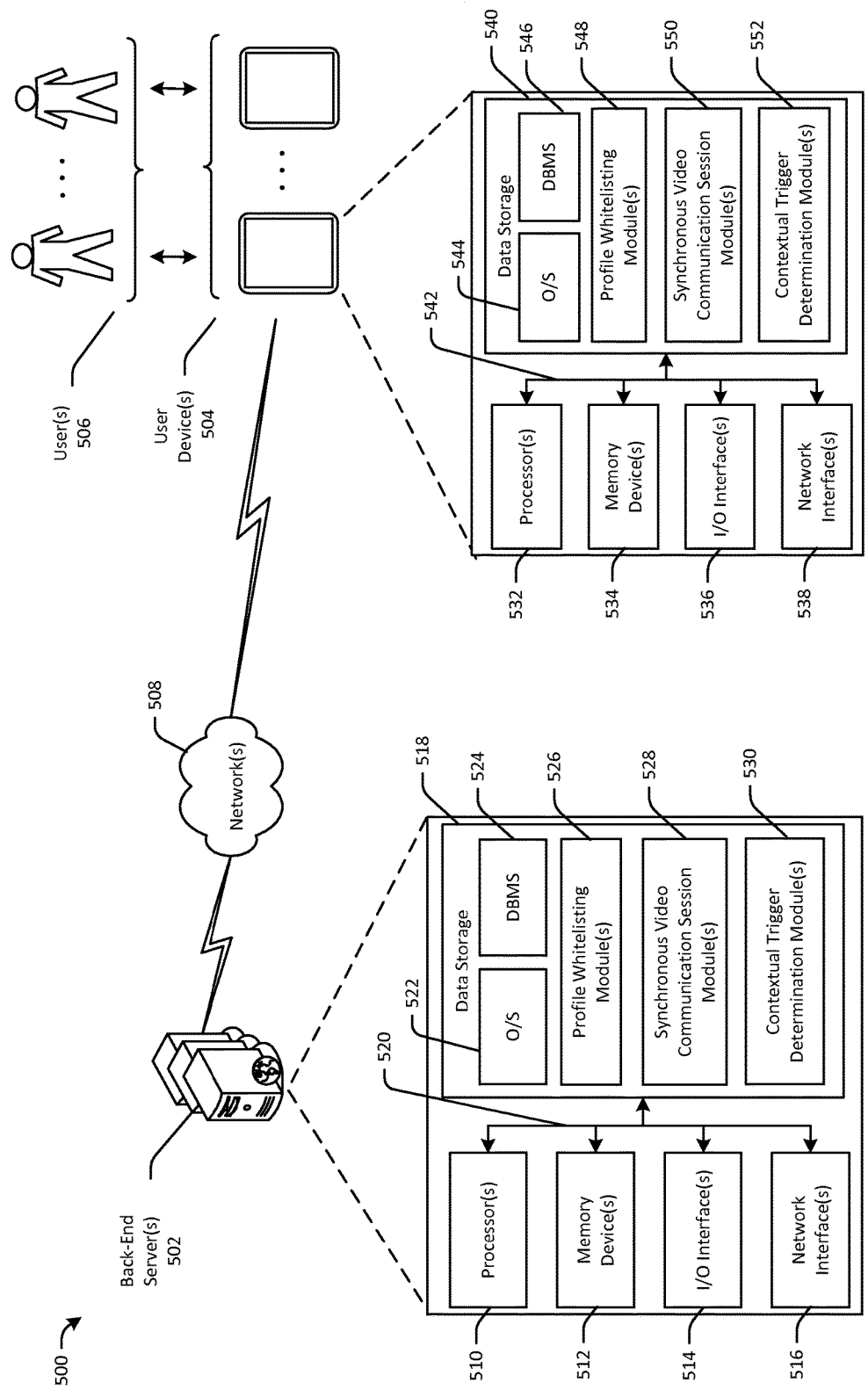
FIG. 5 is a schematic diagram of an illustrative networked architecture in accordance with one or more example embodiments of the disclosure.

FIG. 5 is a schematic diagram of an illustrative networked architecture 500 in accordance with one or more example embodiments of the disclosure. The networked architecture 500 may include one or more back-end servers 502 and one or more user devices 504. One or more users 506 may interact with the user device(s) 504. For example, a user 506 may utilize a user device 504 to engage in a video communication session with another device. The user device(s) 504 may, in various example embodiments, include Device A and Device B depicted in FIGS. 1A-1B and FIGS. 2A-2E. While the back-end server(s) 502 and/or the user device(s) 504 may be referred to herein in the singular, it should be appreciated that multiple ones of any of the illustrative components of the networked architecture 500 may be provided, and any processing described as being performed by a particular component of the architecture 500 may be performed in a distributed manner by multiple such components. Further, a designator (e.g., "A", "B", etc.) may at times be used herein to distinguish multiples one of the same component of the networked architecture 500.

The back-end server 502 and the user device 504 may be configured to communicate via one or more networks 508. The network(s) 508 may include one or more of the network(s) 220. In addition, a first user device 504 may be configured to communicate with a second user device 504 via the network(s) 508 (and potentially via the back-end server 502). The network(s) 508 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 508 may have any suitable communication range associated therewith and may include, for example, global networks (e.g., the Internet), metropolitan area networks (MANs), wide area networks (WANs), local area networks (LANs), or personal area networks (PANs). In addition, the network(s) 508 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the back-end server 502 may include one or more processors (processor(s)) 510, one or more memory devices 512 (generically referred to herein as memory 512), one or more input/output ("I/O") interface(s) 514, one or more network interfaces 516, and data storage 518. The back-end server 502 may further include one or more buses 520 that functionally couple various components of the server 502. These various components of the server 502 will be described in more detail hereinafter.

The bus(es) 520 may include at least one of a system bus, a memory bus, an address bus, or a message bus, and may permit exchange of information (e.g., data (including computer-executable code), signaling, etc.) between various components of the server 502. The bus(es) 520 may include, without limitation, a memory bus or a memory controller, a peripheral bus, an accelerated graphics port, and so forth. The bus(es) 520 may be associated with any suitable bus architecture including, without limitation, an Industry Standard Architecture (ISA), a Micro Type Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 512 of the server 502 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 512 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 512 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 518 may include removable storage and/or non-removable storage including, but not limited to, magnetic storage, optical disk storage, and/or tape storage. The data storage 518 may provide non-volatile storage of computer-executable instructions and other data. The memory 512 and the data storage 518, removable and/or non-removable, are examples of computer-readable storage media (CRSM) as that term is used herein.

The data storage 518 may store computer-executable code, instructions, or the like that may be loadable into the memory 512 and executable by the processor(s) 510 to cause the processor(s) 510 to perform or initiate various operations. The data storage 518 may additionally store data that may be copied to memory 512 for use by the processor(s) 510 during the execution of the computer-executable instructions. Moreover, output data generated as a result of execution of the computer-executable instructions by the processor(s) 510 may be stored initially in memory 512, and may ultimately be copied to data storage 518 for non-volatile storage.

More specifically, the data storage 518 may store one or more operating systems (O/S) 522; one or more database management systems (DBMS) 524; and one or more program modules, applications, or the like such as, for example, one or more profile whitelisting modules 526, one or more synchronous video communication session modules 528, and one or more contextual trigger determination modules 530. Any of the program modules may include one or more sub-modules. Any of the modules depicted in FIG. 5 may include computer-executable code, instructions, or the like that may be loaded into the memory 512 for execution by one or more of the processor(s) 510. In addition, any data stored in one or more datastores (not shown) may be accessed via the DBMS 524, stored in the data storage 518, and loaded in the memory 512 for use by the processor(s) 510 in executing computer-executable code of any of the program modules.

The networked architecture 500 may further include one or more datastores (not shown) that may include, without limitation, databases (e.g., relational, object-oriented, etc.), file systems, flat files, distributed datastores in which data is stored on more than one node of a computer network, peer-to-peer network datastores, or the like. Such datastore(s) may store various types of data such as, for example, device profile data, user profile data, communal and/or user profile-specific UIs, video and/or audio data, contextual trigger data, and so forth. Any data stored in such datastore(s) may be generated by the back-end server 502 and/or the user device 504. Further, any data stored in such datastore(s) may be generated by one component of the networked architecture 500, stored in the datastore(s), and retrieved from the datastore(s) by another component of the networked architecture 500.

The processor(s) 510 may be configured to access the memory 512 and execute computer-executable instructions loaded therein. For example, the processor(s) 510 may be configured to execute computer-executable instructions of the various program modules of the server 502 to cause or facilitate various operations to be performed in accordance with one or more embodiments of the disclosure. The processor(s) 510 may include any suitable processing unit capable of accepting data as input, processing the input data in accordance with stored computer-executable instructions, and generating output data. The processor(s) 510 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 510 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 510 may be capable of supporting any of a variety of instruction sets.

Referring now to functionality supported by the various program modules depicted as part of the server 502 in FIG. 5, the profile whitelisting module(s) 526 may include computer-executable instructions, code, or the like that responsive to execution by one or more of the processor(s) 510 may cause operations to be performed for linking or otherwise associating device profiles together in response to user input received at a first device 504A indicating a request to whitelist a second device 504B. In such a scenario, the profile whitelisting module(s) 526 may generate and store a one-way association between the device profiles indicating that the first device 504A has whitelisted the second device 504B. If similar user input is received at the second device 504B, the profile whitelisting module(s) 526 may generate and store a two-way association between the device profiles.

The synchronous video communication session module(s) 528 may include computer-executable instructions, code, or the like that responsive to execution by one or more of the processor(s) 510 may cause operations to be performed for sending a video data stream from a first device 504A to a second device 504B upon receiving an indication (potentially from the profile whitelisting module(s) 526) that the second device 504B has been whitelisted by the first device 504A. As previously discussed, the video data stream may be a live persistent data stream that is partially obscured. If the first device 504A and the second device 504B are symmetrically whitelisted, the synchronous video communication session module(s) 528 may further send a partially obscured video data stream from the second device 504B to the first device 504A.

The synchronous video communication session module(s) 528 may further include computer-executable instructions, code, or the like that responsive to execution by one or more of the processor(s) 510 may cause operations to be performed for initiating a video communication session between a first device 504A and a second device 504B in response to receipt of user input at either the first device 504A or the second device 504B. Assuming for purposes of illustration that the user input is received at the first device 504A and that at least the first device 504A has been whitelisted by the second device 504B, computer-executable instructions, code, or the like of the synchronous video communication session module(s) 528 may be executed by one or more of the processor(s) 510 in response to receipt of the user input to cause an audio data stream that is captured by the first device 504A to be sent to the second device 504B.

Computer-executable instructions, code, or the like of the synchronous video communication session module(s) 528 may additionally be executed by one or more of the processor(s) 510 to cause a video data stream that captures an environment in which the first device 504A is located to be sent from the first device 504A to the second device 504B. If the second device 504B has also been whitelisted by the first device 504A, the partially obscured video stream of the environment in which the first device 504A is located that is presented on the second device 504B may be made clear (e.g., the partial obscurity may be removed). Upon receipt of an acknowledgment of the video communication session at the second device 504B (e.g., user input received at the second device 504B that identifies the first device 504A or a user profile associated with the first device 504A), computer-executable instructions, code, or the like of the synchronous video communication session module(s) 528 may be executed by one or more of the processor(s) 510 to cause bi-directional audio and video data streams to be exchanged between the first device 504A and the second device 504B.

The contextual trigger determination module(s) 530 may include computer-executable instructions, code, or the like that responsive to execution by one or more of the processor(s) 510 may cause operations to be performed for determining that an audio and/or video data stream exchanged during a video communication session includes a contextual trigger, identifying contextual information and/or a candidate user action corresponding to the contextual trigger, and presenting the contextual information and/or a UI component for initiating the candidate user action on one or more of the devices 504 involved in the video communication session.

Referring now to other illustrative components depicted as being stored in the data storage 518, the O/S 522 may be loaded from the data storage 518 into the memory 512 and may provide an interface between other application software executing on the server 502 and hardware resources of the server 502. More specifically, the O/S 522 may include a set of computer-executable instructions for managing hardware resources of the server 502 and for providing common services to other application programs (e.g., managing memory allocation among various application programs). The O/S 522 may include any operating system now known or which may be developed in the future including, but not limited to, any server operating system, any mainframe operating system, or any other proprietary or non-proprietary operating system.

The DBMS 524 may be loaded into the memory 512 and may support functionality for accessing, retrieving, storing, and/or manipulating data stored in the memory 512 and/or data stored in the data storage 518. The DBMS 524 may use any of a variety of database models (e.g., relational model, object model, etc.) and may support any of a variety of query languages. The DBMS 524 may access data represented in one or more data schemas and stored in any suitable data repository.

Referring now to other illustrative components of the server 502, one or more input/output (I/O) interfaces 514 may be provided that may facilitate the receipt of input information by the server 502 from one or more I/O devices as well as the output of information from the server 502 to the one or more I/O devices. The I/O devices may include, for example, one or more user interface devices that facilitate interaction between a user and the server 502 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The server 502 may further include one or more network interfaces 516 via which the server 502 may communicate with any of a variety of other systems, platforms, networks, devices, and so forth. Such communication may occur via any of one or more of the network(s) 508.

The user device(s) 504 may include a display, a touch sensor, one or more processors, one or more memories, persistent data storage, input/output interface(s), network interface(s), and so forth. In certain example embodiments, a user device 504 may be configured for stationary use within a particular environment and may be configured to capture a video feed of the environment that can be sent to other user devices 504.

In an illustrative configuration, the user device 504 may include one or more processors (processor(s)) 532, one or more memory devices 534 (generically referred to herein as memory 534), one or more input/output ("I/O") interface(s) 536, one or more network interfaces 538, and data storage 540. The user device 504 may further include one or more buses 542 that functionally couple various components of the user device 504. The data storage 540 may store one or more operating systems (O/S) 544; one or more database management systems (DBMS) 546; and one or more program modules, applications, or the like such as, for example, one or more profile whitelisting modules 548, one or more synchronous video communication session modules 550, and one or more contextual trigger determination modules 552. Any of the illustrative components of the user device 504 may correspond in type and/or function to correspondingly named components of the server 502.

It should be appreciated that the program modules, applications, computer-executable instructions, code, or the like depicted in FIG. 5 as being stored in the data storage 518 and the data storage 540 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the server 502, locally on the user device 504, and/or hosted on other computing device(s) accessible via one or more of the network(s) 508, may be provided to support functionality provided by the program modules, applications, or computer-executable code depicted in FIG. 5 and/or additional or alternate functionality. Further, functionality may be modularized differently such that processing described as being supported collectively by the collection of program modules depicted in FIG. 5 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 5 may be implemented, at least partially, in hardware and/or firmware across any number of devices.

It should further be appreciated that any of the components of the networked architecture 500 may include alternate and/or additional hardware, software, or firmware components beyond those described or depicted without departing from the scope of the disclosure. More particularly, it should be appreciated that software, firmware, or hardware components depicted as forming part of the server 502 and/or the user device 504 are merely illustrative and that some components may not be present or additional components may be provided in various embodiments. While various illustrative program modules have been depicted and described as software modules stored in data storage 518 or the data storage 540, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the method 300 and/or the method 400 described above may be performed by one or more program modules, applications, or the like executing on the server 502 or by one or more program modules, applications, or the like executing on one or more user devices 504. It should further be appreciated that any of the operations of the method 200 and/or the method 300 may be performed, at least in part, in a distributed manner by one or more servers 502 and one or more user devices 504, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the method 300 and/or the method 400 may be performed in the context of the illustrative configuration of the server 502 and/or the illustrative configuration of the user device 504 depicted in FIG. 5, it should be appreciated that such operations may be implemented in connection with numerous other device configurations.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
   receiving, from a first user device, an indication of first user input received at the first user device, the first user input corresponding to a request to provide a second user device with access to a first video stream of a first environment that is within a first field of view of a first camera of the first user device, the first video stream including a series of low fidelity blurred video frames of the first environment;
   asymmetrically linking a first device profile of the first user device with a second device profile of the second user device by storing an identifier of the second device profile in association with the first device profile to indicate that the second user device has access to the first video data stream of the first environment;
   receiving, from the second user device, second user input received at the second user device;
   determining that the second user input includes a trigger word that identifies a first user profile associated with the first device profile;
   initiating a video communication session between the first user device and the second user device, wherein initiating the video communication session comprises:
     sending, to the first user device, a first audio data stream captured at the second user device, and
     sending, to the first user device, a second video data stream of a second environment that is within a second field of view of a second camera of the second user device;
   generating a third video data stream of the first environment, the third video data stream including a series of high fidelity video frames of the first environment;
   sending the third video data stream to the second user device; and sending, to the second user device, a second audio data stream captured at the first user device.

2. The method of claim 1, further comprising:
receiving, from the second user device, an indication of the third user input received at the second user device, the third user input corresponding to a request to provide the first user device with access to a fourth video data stream of the second environment, wherein the fourth video data stream comprises a series of low fidelity blurred video frames of the second environment;
symmetrically linking the first device profile with the second device profile by storing an identifier of the first device profile in association with the second device profile to indicate that the first user device has access to the fourth video data stream of the second environment;
sending, to the first user device, the fourth video data stream; and
ceasing transmission of the fourth video data stream to the first user device prior to sending the second video data stream to the first user device.

3. The method of claim 1, further comprising:
determining that no object depicted in the third video data stream has moved for a predetermined period of time;
determining that the second audio data stream is below a threshold decibel level for the predetermined period of time; and
terminating the video communication session.

4. The method of claim 1, further comprising:
determining that at least one of the first audio data stream or the second audio data stream includes an identifier of a third user profile associated with a third user device;
determining that the third user profile is associated with at least one of the first user profile or a second user profile associated with the second user device;
presenting, via at least one of a first display of the first user device or a second display of the second user device, a user interface component that identifies the third user profile and that enables including the third user profile in the video communication session;
receiving data indicating a selection of the user interface component; and
sending the first audio data stream, the second audio data stream, the second video data stream, and the third video data stream to the third user device.

5. A method, comprising:
determining that a first device profile of a first user device is associated with a second device profile of a second user device, wherein the association between the first device profile and the second device profile enables a visual indicator of a first environment in which the first user device is located to be presented on the second user device, wherein the visual indicator includes video frames;
receiving, from the second user device, after presentation of the visual indicator to the second user device, user input received at the second user device;
determining that the user input includes a trigger word that identifies a first user profile associated with the first device profile; and
initiating a video communication session between the first user device and the second user device, wherein initiating the video communication session comprises:
sending, to the first user device, a first audio data stream captured at the second user device, and
sending, to the first user device, a first video data stream captured at the second user device, the first video data stream depicting a second environment in which the second user device is located;
sending, to the second user device, a second video data stream captured at the first user device, the second video data stream depicting the first environment; and
sending, to the second user device, a second audio data stream captured at the first user device.

6. The method of claim 5, further comprising:
receiving, from the first user device, a first indication that a user is present in the first environment;
sending, to the second user device, a second indication that the user is present in the first environment to enable the visual indicator to be presented via a display of the second user device, wherein the visual indicator indicates presence of the user in the first environment.

7. The method of claim 6, wherein the visual indicator includes a continuous video data stream comprising the video frames, the video frames including a series of low fidelity blurred video frames depicting presence of the user in the first environment.

8. The method of claim 7, further comprising ceasing transmission of the continuous video data stream to the second user device prior to sending the second video data stream to the second user device, the second video data stream including a series of high fidelity video frames from which an identity of the user is discernible.

9. The method of claim 5, wherein the user input is first user input; the method further comprising:
receiving, from the first user device, an indication of second user input received at the first user device, the second user input corresponding to a request to provide the second user device with access to the visual indicator;
asymmetrically linking the first device profile with the second device profile by storing an identifier of the second device profile in association with the first device profile to indicate that the second user device has access to the visual indicator.

10. The method of claim 5, further comprising:
determining that at least one of the first audio data stream or the second audio data stream includes a contextual trigger;
determining contextual information corresponding to the contextual trigger; and
presenting the contextual information via at least one of a first display of the first user device or a second display of the second user device.

11. The method of claim 5, further comprising:
determining that at least one of the first audio data stream or the second audio data stream includes a contextual trigger;
determining a candidate user action corresponding to the contextual trigger;
presenting, via at least one of a first display of the first user device or a second display of the second user device, a user interface component that identifies the candidate user action;
receiving data indicating a selection of the user interface component; and
initiating the candidate user action.

12. The method of claim 5, further comprising:
determining that no object depicted in the first video data stream has moved for a predetermined period of time;
determining that the first audio data stream s below a threshold decibel level for the predetermined period of time; and
terminating the video communication session.

13. The method of claim 5, wherein the visual indicator is a first visual indicator, and wherein determining that the first device profile is associated with the second device profile comprises:
  determining that the second device profile has a first permission level in relation to the first device profile that enables the first visual indicator to be presented on the second device; and
  determining that the first device profile has a second permission level in relation to the second device profile that enables a second visual indicator to be presented on the first device,
  wherein the first visual indicator is a continuous video data stream depicting a user present in the first environment and the second visual indicator is a graphical representation of the user.

14. The method of claim 5, further comprising:
  determining that the trigger word identifies a user profile associated with the first device profile; and
  receiving an indication from the first user device that a user associated with the user profile has been detected within the first environment.

15. A device comprising:
  a display;
  a camera;
  at least one memory storing computer-executable instructions; and
  at least one processor operatively coupled to the display and the at least one memory, wherein the at least one processor is configured to execute the computer-executable instructions to:
    receive first user input corresponding to a request to associate a first device profile of the device with a second device profile of a second device to enable an indication of presence of a user in a first environment in which the device is located to be sent to the second device; Wherein the visual indicator include video frames;
    associate the first device profile with the second device profile by storing an identifier of the second device profile in association with the first device profile to indicate that the second device is eligible to receive the indication of the presence of the user in the first environment;
    detect the presence of the user in a field of view of the camera;
    send, to the second device, the indication of the presence of the user in the first environment to enable presentation of a visual indicator of the user on the second device;
    receive a first audio data stream captured at the second user device;
    receive a first video data stream captured at the second user device and depicting a second environment in which the second user device is located;
    send a second video data stream to the second device, the second video data stream depicting the first environment; and
    send a second audio data stream to the second device.

16. The system of claim 15, wherein the indication of the presence of the user and the visual indicator are a continuous video data stream comprising a series of low fidelity blurred video frames depicting presence of the user in the first environment.

17. The device of claim 15, wherein the at least one processor is further configured to execute the computer-executable instructions to:
  determine that at least one of the first audio data stream or the second audio data stream includes a contextual trigger;
  determine contextual information corresponding to the contextual trigger; and
  present the contextual information via the display.

18. The device of claim 15, wherein the at least one processor is further configured to execute the computer-executable instructions to:
  determine that at least one of the first audio data stream or the second audio data stream includes a contextual trigger;
  determine a candidate user action corresponding to the contextual trigger;
  present, via the display, a user interface component that identifies the candidate user action;
  receive data indicating a selection of the user interface component; and
  initiate the candidate user action based on receipt of the data indicating the selection of the user interface component.

19. The device of claim 15, wherein the at least one processor is further configured to execute the computer-executable instructions to:
  determine that no object depicted in the second video data stream has moved for a predetermined period of time;
  determine that the second audio data stream is below a threshold decibel level for the predetermined period of time; and
  terminate a video communication session between the first device and the second device.

* * * * *